Figure 1:
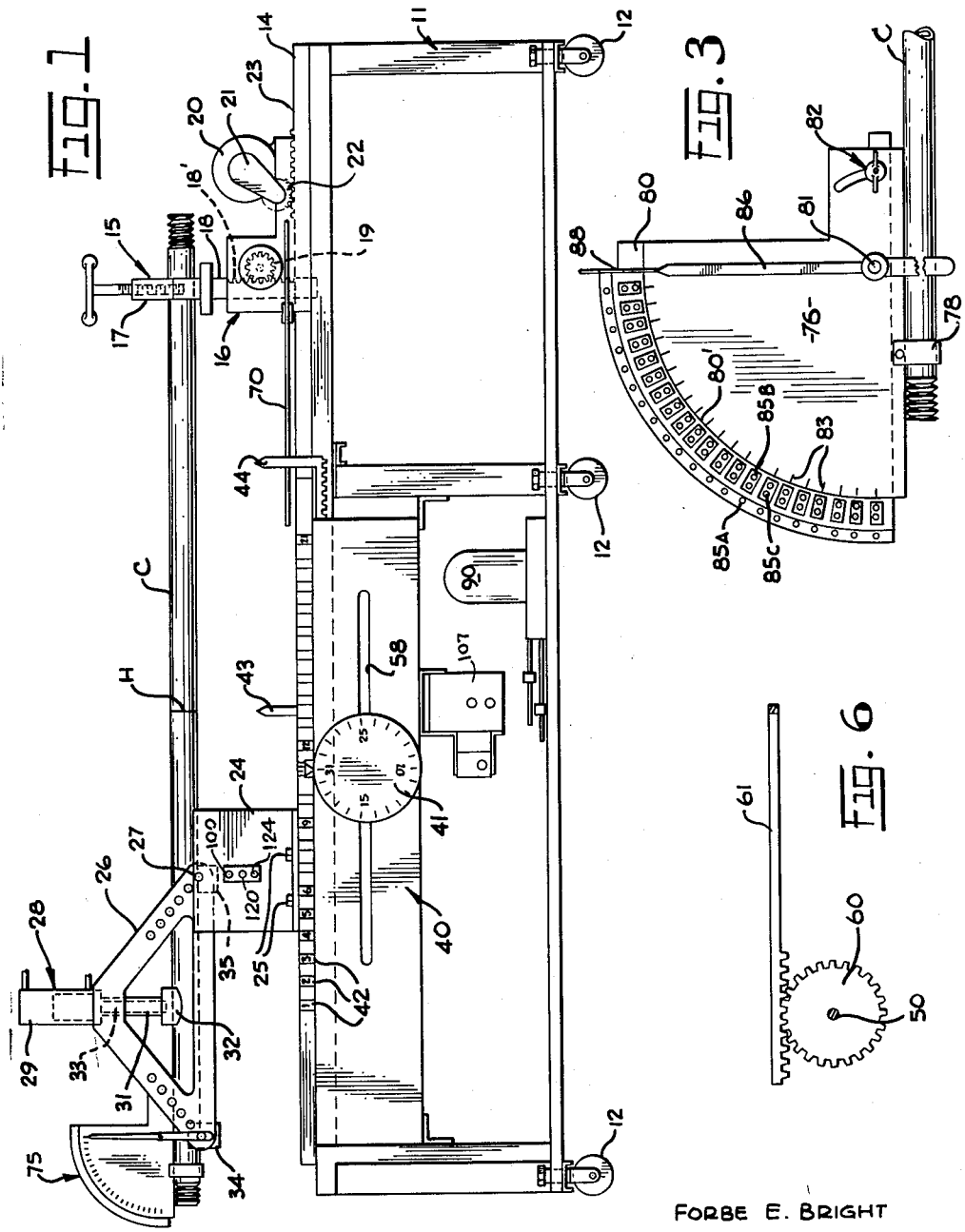

Jan. 29, 1963  F. E. BRIGHT  3,075,568
MACHINE FOR PRECISION BENDING OF ELECTRICAL CONDUIT
Filed Dec. 19, 1958  4 Sheets-Sheet 1

FORBE E. BRIGHT
INVENTOR.

BY *Mason & Graham*

ATTORNEYS

FORBE E. BRIGHT
INVENTOR.

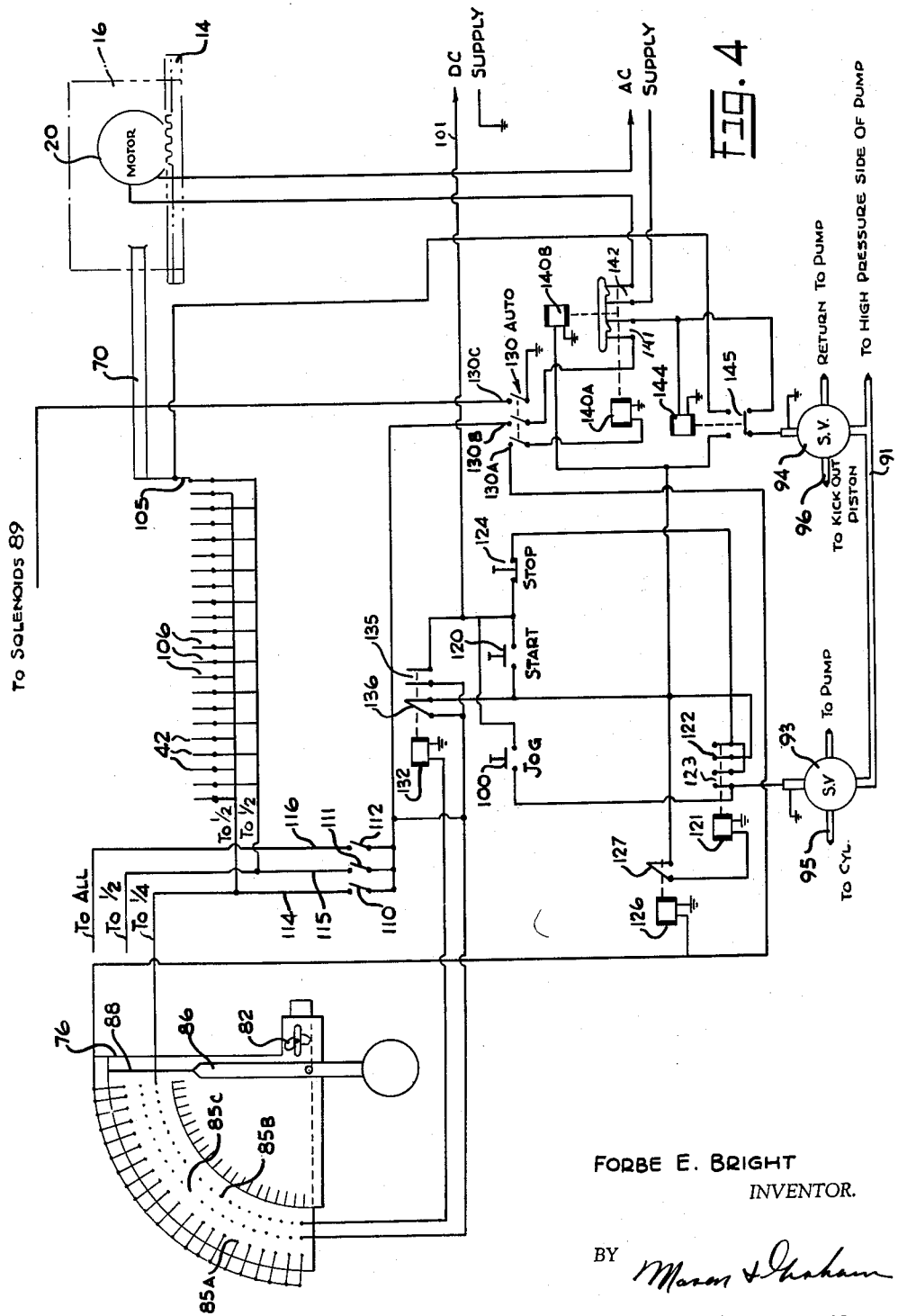

Jan. 29, 1963 F. E. BRIGHT 3,075,568
MACHINE FOR PRECISION BENDING OF ELECTRICAL CONDUIT
Filed Dec. 19, 1958 4 Sheets-Sheet 4
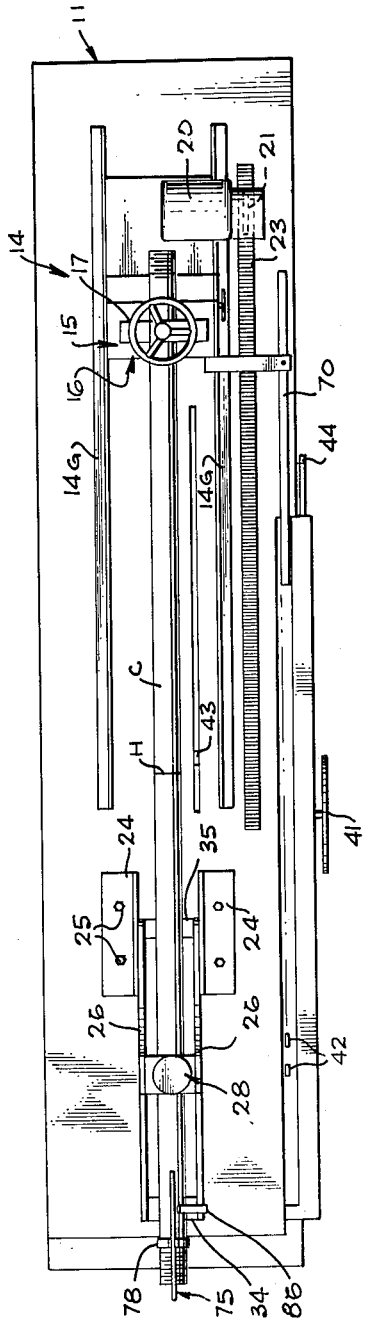
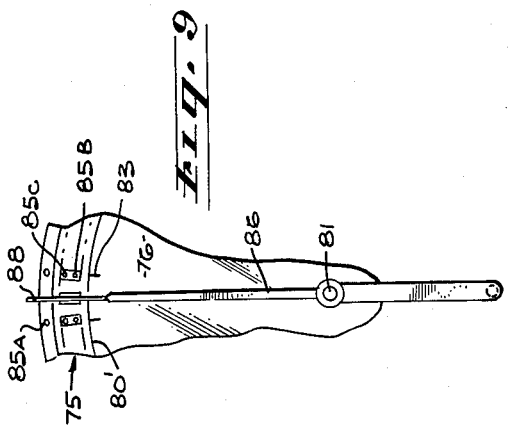
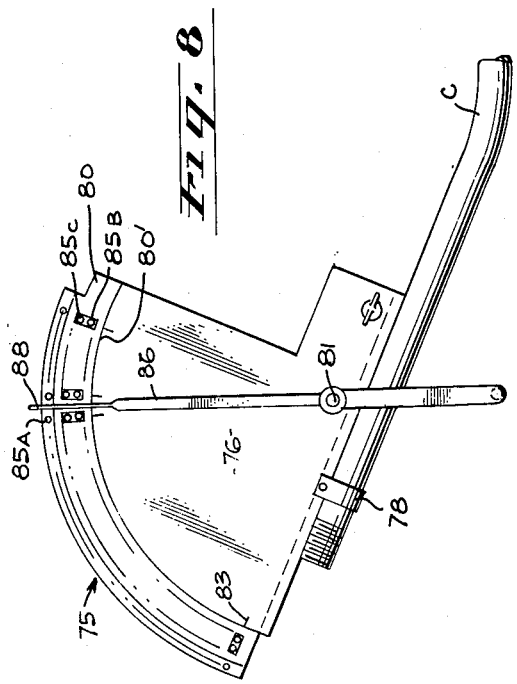
FORBE E. BRIGHT
INVENTOR.
BY
ATTORNEYS

United States Patent Office 3,075,568
Patented Jan. 29, 1963

3,075,568
MACHINE FOR PRECISION BENDING OF
ELECTRICAL CONDUIT
Forbe E. Bright, Paso Robles, Calif., assignor of forty percent to Claude D. Draucker, Los Angeles, Calif.
Filed Dec. 19, 1958, Ser. No. 781,716
20 Claims. (Cl. 153—39)

This invention has to do generally with the bending of metal tubing or pipe, particularly electrical conduit.

In large buildings and industrial plants, Building and Safety Codes require that the electrical wiring be installed in rigid metal tubing or pipe, known as electrical conduit. Each installation presents a different problem since the conduit must follow a sinuous path through the walls and floors of the building or plant, entailing many bends of special shape and size which are customarily made at the site. Due to the substantial rigidity of the conduit and the knowledge of mathematics, procedure and skill required, the bending of conduit, particularly large diameter conduit, is a difficult and extremely time consuming operation of which only a few persons are capable. In making a bend of predetermined dimensions, the conduit must be successively bent slightly at evenly spaced points throughout the total bend area in order to prevent flattening of the conduit. Thus, under known methods it is necessary to accurately lay out these bend points on the conduit before actual bending operations can be begun. Also, in making the individual bends, or "shots" as they are called, great care must be taken that the conduit be bent the exact amount in each case, and this is complicated by the springback of the steel of the conduit when the bending force is removed. Even with experienced men a great deal of conduit is improperly bent and must be discarded.

It therefore is an object of my invention to provide a novel and improved machine for the purpose of accurately bending conduit, pipe or the like, to predetermined dimensions, substantially automatically, which eliminates the necessity of having to mentally determine and manually lay out the bend points on the conduit.

A further object is to provide such a machine which can be manipulated to automatically indicate the distance between bend points of a given bending operation as well as to accurately indicate in conjunction therewith the exact place to make the first bend, or shot, and where to make each succeeding bend, or shot.

Another object is to provide a machine of the type indicated having a radius indicating means which can be adjusted for the radius of curvature desired for the bend to be made, and mechanical computer and indicator means operatively connected therewith and operable in response thereto to automatically compute and indicate, in accordance with an acceptable predetermined formula or ratio, the spacing and location of the points at which the individual "shots" or bends should be made.

Still another object is to provide a machine of the type indicated wherein the machine itself, once it is adjusted to compensate for the springback of the conduit after being bent, will then function automatically to successively bend the conduit at spaced regions therealong by the required amount.

In this connection it is still another object to provide electrohydraulic means for controlling the operation of a conduit bending machine including an adjustable gauge that can be set to compensate for the normal springback of the conduit.

A further object is to provide a conduit or pipe bending machine of relatively simple construction which can be readily operated by one who has no special knowledge of conduit bending or the mathematics and formulae normally required therein.

Figure 2:
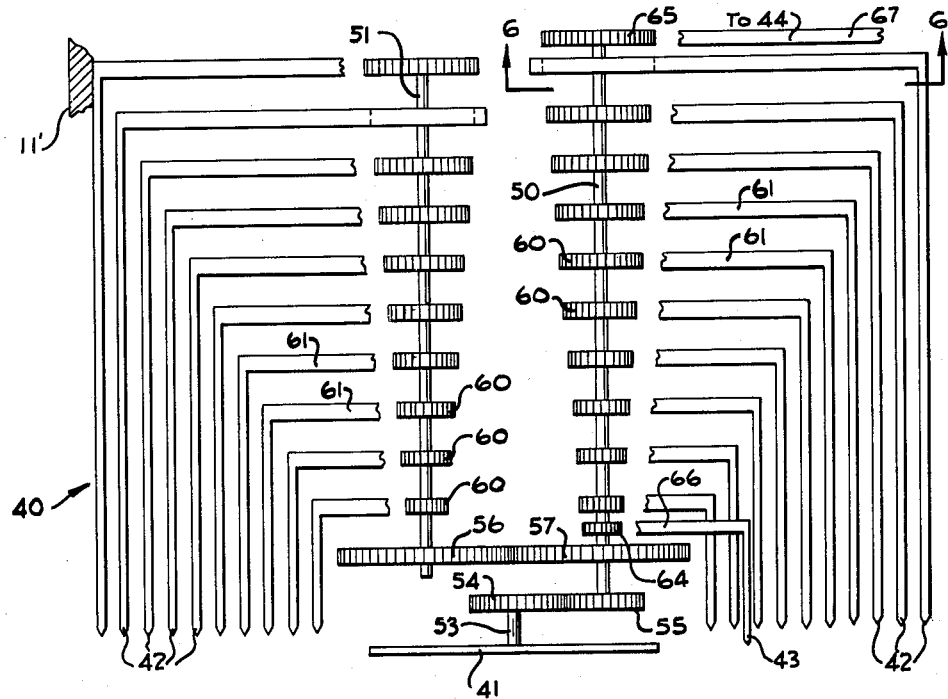
Figure 5:
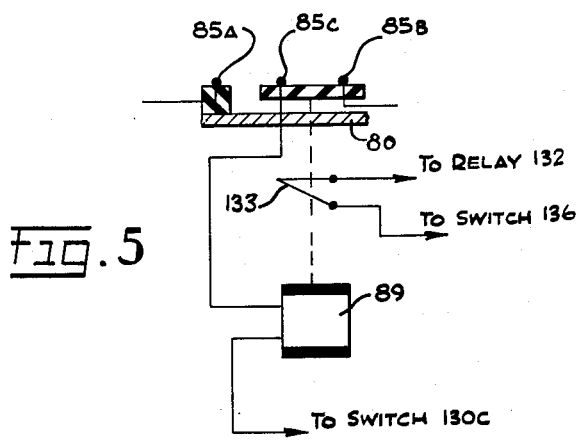

These and other objects will be apparent from the drawings and the following description. Referring to the drawings, which are to a large extent diagrammatic:

FIG. 1 is a side elevational view of a machine embodying the invention;
FIG. 2 is a diagrammatic view of the computing and indicating portion of the device of FIG. 1;
FIG. 3 is a face view of the gauge employed to determine the amount of bend;
FIG. 4 is a schematic representation of the electrical hydraulic components of the machine; and
FIG. 5 is a schematic view of a portion of the gauge of FIG. 3 which supplements the showing of FIG. 4;
FIG. 6 is a fragmentary sectional view on line 6—6 of FIG. 2.
FIG. 7 is a plan view of the apparatus of FIG. 1; and
FIGS. 8 and 9 are fragmentary side elevational views of the end of the pipe being bent and the gauge carried thereby, the views illustrating different positions of the pipe.

More particularly describing the invention, referring first to FIG. 1, numeral 11 generally designates the frame of the machine which is shown as being supported upon a plurality of vertically adjustable wheels 12 which enable the level positioning of the frame. The frame may be of any sound mechanical design and may be fitted with a suitable housing for enclosing storage compartments as well as the elements of the machine itself, although this has not been shown. Supported on the frame is a bed 14 upon which is mounted a conduit-supporting means 15. The latter includes a carriage 16 movable along the bed longitudinally of the frame in suitable guideways 14G and a conduit clamp or vise 17 carried upon a vertically adjustable post 18 having a rack portion 18' which meshes with a self-locking handwheel pinion 19. The carriage is shown provided with an electric motor 20 with reduction gearing 21 driving a pinion 22 in mesh with a rack 23 on the bed 14 for the purpose of advancing and retracting the carriage.

The frame also carries a support 24 which may be secured in proper position along bed 14 by cap screws 25 which fit into selected ones of threaded holes (not shown) in the bed 14. The support carries a triangular frame means 26 which is pivotally mounted at 27 upon the carriage 24. At its apex or inner corner, frame 26 carries a piston-cylinder unit 28 adapted to be supplied with fluid under pressure from a suitable source, as will later be explained. The unit 28 includes a cylinder 29 which is fixed to the frame 26 and a piston including a main piston rod 31 carrying a detachable conduit-engaging shoe 32. A small kickout piston 33 is contained within rod 31, the latter acting as a cylinder therefor. Conventional fluid passages may be provided in the unit 28 to enable pressure fluid to extend the piston 33 when the main piston is retracted or no pressure is applied thereto to extend it. Shoe 32 may be apertured to pass the piston 33.

The frame means 26 also carries a pair of conduit-engaging shoes, one at each of its outer corners, these being designated 34 and 35. Apart from the inclusion of the kickout piston 33 the conduit bending means is of relatively conventional construction.

The conduit to be bent, designated "C," is shown supported by the vise 17 and the conduit bending frame 26.

In the bending of the conduit it is essential to bend the conduit a part of the total curvature required at a plurality of relatively close points spaced evenly throughout the whole bend. One of the unique features of the machine is the provision of means whereby the location and spacing of the bend points may be mechanically determined and indicated merely by turning a wheel provided with indicia designating radii of bend. Another requirement in the bending of conduit is the necessity of knowing the height or extent to which the bent portion of the conduit is to reach laterally of the main axis of the conduit and the point on the conduit where the first of the series of bends is to be made. It is another feature of my invention that I provide in conjunction with the bend point determining and indicating means, a means for first determining where the first bend is to be made in conjunction with the knowledge of the height and the radius of the bend to be made. Thus I provide a radius selector and bend point computer and indicating means 40 upon the frame. This includes a manually rotatable radius selector wheel or dial 41, a plurality of bend point indicator elements 42, and two height indicator elements 43 and 44. The height indicators are for the purpose of locating the conduit originally in proper position on the machine with reference to the bend point indicators. The known height to which the conduit is to extend after being bent is measured from the left-hand end of the conduit and a height mark "H" placed on the conduit indicating this distance. This mark is subsequently aligned with the appropriate one of the two height indicators 43 and 44.

The bending point computing and indicating means 40 is shown diagrammatically in FIG. 2. Referring to this figure, I provide two shafts designated 50 and 51, respectively. The first of these is rotated by the radius selector dial or wheel 41 which is fixedly mounted upon a stub shaft 53 which carries a gear 54 fixed thereto and in meshing engagement with a corresponding gear 55 fixed to shaft 50. The two shafts are rotated together in opposite directions by two meshing gears 56 and 57 fixedly carried on the respective shafts.

The first or number "1" bend point indicator, 42, is stationary, being attached to frame part 11' as shown in FIG. 2. The other indicators are adapted to move longitudinally of the machine as is the dial 41 and associated shafts and gearing to be described. A slot 58 in the casing (FIG. 1) accommodates the shaft 53. In order to move the indicators in accordance with a predetermined ratio, each shaft is provided with a series of gears 60 which are graduated in size. Associated with each gear 60 is a rack member 61 which carries one of the bend point indicators 42.

The computing and indicating means may be designed upon the conventional formula that the amount of conduit in a 90-degree bend or turn is equal to 1.57 times the radius of the curve. Thus the gears 60 are so proportioned that for each one inch increase in the radius adjustment the distance between the first bend point indicator and the last bend point indicator increases 1.57ths of an inch. Therefore, whatever radius is selected the two outside bend point indicators determine the amount of conduit required in the bend, and, in conjunction with the other indicators, have marked off or indicated this distance in twenty equal spaces.

The first shaft 50 is also provided with two additional gears 64 and 65 which drive rack members 66 and 67, respectively, carrying the height indicator pointers 43 and 44, respectively. The indicator 43 is intended for use where the radius of the bend is from 8 to 32 inches, while the other is used for radii of from 33 to 64 inches. The gears 64 and 65, which drive the rack members 66 and 67 carrying the height indicators 43 and 44, respectively, are designed upon the formula that "height" minus "radius," is the point where the first of the series of bends is made. Therefore indicator 43 is geared to move at a rate of .215 of an inch for each one inch increase in radius, as indicated by rotating the radius selector dial 41, while indicator 44 moves 1.215 of an inch for each one inch increase in radius.

The carriage 16 of the conduit-supporting means is provided with an adjustable gauge rod 70 which is used in connection with the bend point indicators in a manner later to appear.

In the process of making a bend the operator after having first determined the height to which the conduit is to extend, places a height mark "H" upon the conduit. Knowing the radius of curvature desired the radius selector dial is then turned to this figure and if it is between 8 and 32 inches, the conduit is so positioned that the height mark "H" is directly over or in vertical alignment with the height indicator 43. The bending means 20 should be so located that the bending shoe 32 is directly over the first or number "1" bend point indicator 42. Also, the gauge rod 70 is adjusted so that the end thereof is directly opposite the last or No. 21 bend point indicator, and clamped in this position. The bending means 20 is then operated to bend the conduit 1/20 of the total bend desired, this being determined by means of a gauge 75 which is mounted at the end of the conduit. While conventional gauges may be used for this purpose, I prefer to employ a special adjustable electrical gauge in conjunction with certain electrical and hydraulic control mechanism for the purpose of making the operation of the machine substantially automatic. Apart from the automatic features which will be described below, the gauge 75 is adjustable so that it can be set to compensate for the springback of the conduit after it is bent. After the initial bend, it is so adjusted and bending is continued on the first of the bend point indicators until the correct amount of bend has been achieved. Following this the conduit is advanced by advancing carriage 16 until gauge rod 70 is at the next bend point indicator 42. The process is repeated, that is, the conduit is bent successively upon each of the bend point indicators for the required amount as indicated by the gauge 75, thereby completing the bend.

Referring now to FIG. 3, which is a face view of a preferred form of gauge, this comprises a main plate 76 and a clamp 78 for attachment of the same to the end of the conduit. Adjustably mounted for limited pivotal movement relative to the main plate is a secondary plate 80, the two plates being pivoted at 81 and being connected by a bolt-and-slot connection 82. The main plate extends along its arcuate edge through 90 degrees and is provided along this margin with 42 evenly spaced indicia 83. Along its corresponding margin the secondary or adjustable plate is provided with forty-two groups of electric contacts, (for clarity of illustration, only twenty-one are shown in FIG. 3) each group having an outer contact 85A, an inner contact 85B and a center contact 85C. A pendulum indicator 86 is pivotally mounted at 81 upon the plates and has an electrically conductive finger 88 at its upper end adapted to make electrical connection between the three electrical contacts of any of the groups of the contacts with which it becomes aligned. In each group, contacts 85B and 85C are mounted as a pair to be withdrawn by a solenoid 89 when the same is energized, as shown in FIG. 5.

In FIG. 8 the gauge is shown as it would appear midway of a bending step and in FIG. 9 the gauge is shown at the completion of a bending step.

Referring now to FIG. 4, which is a schematic representation of the electrical and hydraulic components, the machine is provided with an electrically driven hydraulic pump 90 (FIG. 1) for the purpose of supplying pressure fluid to the bending means. The fluid pressure line 91 leads from the pump or high-pressure chamber associated therewith to two solenoid valves 93 and 94. These valves control fluid lines 95 and 96, respectively, which lead to the outer end of cylinder 29 and to the so-called kickout piston 33 (and inner end of cylinder 29), respectively. For the purpose of operating the bending means at the will of the operator, I provide a pushbutton "JOG" switch 100 in the current supply conductor 101. When this switch is depressed it closes a circuit from the current source through solenoid valve 93. The latter, when energized, supplies cylinder 29 of the bending means with pressure fluid.

In order to provide for automatic advance of the conduit from one bend point to the next, I provide an electrical contact finger 105 on rod 70 of carriage 16 and an electrical contact 106 upon each of the bend point indicators 42. Considering now the automatic operation, I will describe the remaining electrical components in terms of the operation of the apparatus from which both the nature and function of the various components will be apparent. Numeral 107 designates a casing in which much of the electrical apparatus may be housed.

The operator first closes the selected one or more of switches 110, 111, 112, depending upon the radius of the bend for the particular conduit, these switches when closed serving to connect conductors 114, 115, 116, respectively, to switch 130B. The conductors 114, 115, and 116 are connected, respectively, to one-quarter, one-half, and all of contacts 85B of gauge 75 thereby enabling the operator to set up the machine to make as many individual bends or "shots" for each total bend to be made in the conduit as required. Also, one-half of bend point contacts 106 are connected to line 114 and the other half to line 115. Thus the closing of selected ones of switches 110, 111, and 112 brings the appropriate number of contacts 85B and 106 into the circuit. The operator then presses the "START" button switch 120, momentarily closing a circuit through a relay 121 to thereby close its switch 123 and actuate the solenoid valve 93 which then allows flow of pressure fluid to the bending cylinder 29. Closing of switch points 122 establishes a holding circuit for relay 121 through normally closed "STOP" switch 124.

As the conduit bends, the free end carrying gauge 75 rises and pendulum indicator contact 88 engages the first set of three contacts 85A, 85B, and 85C. This energizes a relay 126, opening its switch 127 thereby dropping relay 121. The latter action opens the circuit to valve 93 and the valve returns to normal in which position the outer end of the bending piston in cylinder 29 is relieved of pressure. When the bending force is relieved from the conduit, the latter springs back a portion of the distance it has been bent. The operator notes the amount of springback on gauge 75 and then adjusts the gauge to compensate for this by advancing the portion 80 thereof.

The operator can now close the "AUTO" switch 130 for automatic operation. "START" button 120 is then depressed energizing relay 121 and again actuating valve 93 to further bend the conduit. Relay 132 is also energized through its normally closed relay switch 136 and switch 133 on gauge 75. This latter switch is normally closed and is associated with the solenoid 89 controlling the last set of contacts 85B and 85C on the gauge, as shown in FIG. 5. Closing of switch 135 of relay 132 energizes all of the contacts 85A and also point 130B of switch 130. Closing of contacts 135 also establishes a holding circuit for relay 132. As the conduit bends up the pendulum contact element 85A again contacts the first set of contacts 85A, 85B, and 85C. The latter contact 85C energizes its associated solenoid 89 on the gauge back plate (FIG. 5), withdrawing contacts 85B and 85C from the path of the wiper contact 88. However, the closing of a circuit through points 85A and 85B by finger 88 energizes relay 126 opening switch 127 which drops relay 121. Also, coil 140A of a latching relay is energized through closed switch 130A, mechanically latching in switches 141 and 142. The latter starts motor 20 of carriage 16 while the former energizes relay 144 and the kickout piston's solenoid valve 94. Relay 144 is of the time-delay type so that switch 145 does not immediately shift, but after a predetermined delay, sets up a circuit for relay 140B.

The carriage motor 20 advances the conduit into the bender until the contact finger 105 on the gauge rod 70 engages the contact finger 106 on the next bend point indicator included in the circuit. This energizes relay 140B unlatching switches 141 and 142 which deenergize relay 144 and stop the carriage advance motor 20 by opening the circuit thereto. Deenergization of relay 144 allows switch 145 to return to its original position. Also, relay 121 is again energized to close switch 123 and actuate the valve 93 thereby starting the bending cycle again. The machine now functions automatically and continues step by step through the bend points until the last set of contacts 85A, 85B, 85C is reached on gauge 75. When this occurs, as the solenoid 89 retracts contacts 85B and 85C, switch 133 (associated only with the last set of contacts) is opened, dropping relay 132, resulting in deenergizing all components of the machine.

The "STOP" switch 124 provides a means for quickly stopping the automatic operation of the machine at any time.

Also, any suitable means can be provided for reversing and controlling the operation of the motor 20 apart from the remainder of the electrical control means.

As previously indicated, for bending conduit on large radii as, for instance, radii of between 32 and 64 inches, it is necessary to make more individual bends than is required for over-all bends of short radii. Thus I provide the additional height indicator 44, as previously described, for this purpose and in using this, the conduit is originally positioned with the height mark "H" directly over or in alignment with indicator 44. The conduit is then bent by twice passing through the series of bend point indicators 42.

Although I have shown and described a preferred form of my invention, I contemplate various changes and modifications can be made thereon without departing from the scope of the invention, as indicated by the claims which follow.

I claim:

1. In a conduit bending machine, a frame, a conduit-supporting means on said frame, a conduit bending means carried on said frame, an adjustable conduit-positioning indicator on said frame for use in locating the conduit with reference to the distance the conduit is to extend laterally of its original axis, a plurality of relatively adjustable conduit bend point indicators on said frame and a radius of bend-indicating means operable to adjust the spacing of said bend point indicators and to adjust the position of said conduit-positioning indicator relative thereto in accordance with a predetermined ratio relative to the radius of bend, said conduit-supporting means being adjustably movable relatively toward and away from said conduit bending means in the direction of extent of said bend point indicators.

2. A conduit bending machine as set forth in claim 1 in which there is provided a second adjustable conduit-positioning indicator on said frame operably connected to the radius of bend-indicating means and operable in response thereto to indicate the proper positioning of a conduit which is to be bent upon a relatively large radius.

3. In a conduit bending machine, a frame, a conduit-supporting means on said frame, a conduit bending means carried on said frame, a plurality of relatively adjustable conduit bend point indicators on said frame, a radius of bend-indicating means operable to adjust the spacing of said bend point indicators in accordance with a predetermined ratio relative to the radius of bend, said conduit-supporting means being adjustably movable relatively toward and away from said conduit bending means in the direction of extent of said bend point indicators.

4. In a conduit bending machine, a frame, a conduit bending means carried on said frame, a conduit-supporting means mounted on said frame and movable toward and away from said conduit bending means, a plurality of relatively adjustable bend point indicators on said frame, and means operable to adjust the spacing of said bend point indicators in accordance with a predetermined ratio relative to a given radius of bend.

5. A machine as set forth in claim 4 in which a conduit-positioning indicator is adjustably mounted on said frame and in which the means operable to adjust the spacing of said bend point indicators is operable to adjustably position said conduit-positioning indicator in accordance with a predetermined ratio with reference to a given radius of bend.

6. A machine as set forth in claim 4 in which the means operable to adjust the spacing of said bend point indicators comprises a rack carrying each indicator and gear means operably connected to said racks.

7. In a conduit bending machine, a frame, a carriage adjustably positionable on said frame, a support on said frame and in alignment with said carriage, and conduit bending means pivotally mounted upon said support upon a horizontal axis whereby said bending means is operable to bend the conduit in a manner to cause it to curve upwardly in a vertical plane.

8. A conduit bending machine as set forth in claim 7 in which a plurality of bend point indicators is mounted on said frame for adjusted positioning of the individual indicators in spaced relation in a direction parallel and adjacent to the axis of the conduit supported.

9. A conduit bending machine as set forth in claim 7 in which a plurality of bend point indicators is mounted on said frame for adjusted positioning of the individual indicators in spaced relation in a direction parallel and adjacent to the axis of conduit supported, and in which means is provided for adjustably spacing said bend point indicators in accordance with a predetermined ratio relative to a given radius of bend.

10. A conduit bending machine as set forth in claim 7 in which a plurality of bend point indicators is provided on said frame, in which means is provided for evenly spacing the individual bend point indicators a given distance in a path parallel to the axis of the conduit to be bent, and an adjustable guide member carried on said carriage for use in conjunction with said bend point indicators in the advancing of the conduit for successive bends.

11. In a conduit bending machine, a frame, a carriage adjustably positionable on said frame, a support on said frame and in alignment with said carriage, means supporting the conduit on said carriage, conduit bending means pivotally mounted upon said support upon a horizontal axis adapted to apply a vertical bending force to the conduit whereby said bending means is operable to bend the conduit in a manner to cause it to curve in a vertical plane, gauge means mounted on the end of the conduit to be bent, fluid pressure means for actuating the bending means, and means operable in response to said gauge for terminating the operation of the bending means at a predetermined point.

12. In a conduit bending machine, a frame, means for supporting a conduit in generally horizontal position, said means including a bending means operable by fluid pressure pivotally mounted about a horizontal axis on said frame and constructed and arranged to apply a vertical bending force to the conduit and permit the conduit to bend in a vertical plane in response thereto, gauge means carried by said conduit at its outer end, said gauge means including a plurality of sets of electric contacts and a gravity-operative member for electrically connecting said contacts depending upon the position thereof, fluid pressure supply means for operating said bending means, and electrofluid control means operable in response to the bending motion of said conduit and including said gauge for rendering said bending means inactive when said conduit is bent a predetermined amount.

13. In a conduit bending machine, a frame, means on said frame for supporting a conduit to be bent in a horizontal position, bending means carried on said frame for pivotal movement in a vertical plane and constructed to apply a vertical bending force to the conduit whereby the same, when bent, curves in a vertical plane, and means for controlling said bending means including a position-sensing device mounted on the free end portion of the conduit to be bent, and means operable in response to said sensing device for inactivating said bending means.

14. A gauge for use as described, comprising a first plate, means on said plate for attaching the same to a conduit or the like, a gravity-type pointer pivotally mounted on said plate, a second plate mounted on said main plate and pivotally adjustable about the axis of said pointer, and a plurality of spaced sets of electrical contacts on said second plate, said pointer having an electrically conductive portion adapted to bridge the contacts of a set of contacts with which it becomes aligned.

15. A gauge as set forth in claim 14 in which certain of said contacts are retractable out of the path of said pointer and in which electromagnetic means is provided for retracting said certain contacts.

16. In a conduit bending machine having a bending means and a motor-driven conduit support means movable toward the bending means, means for automatically bending conduit, comprising means for initially actuating said bending means, a first position-sensing means associated with the end portion of the conduit to be bent, means responsive to said position-sensing means for inactivating said bending means after the conduit has been bent a predetermined amount, means for activating said motor-driven support, means to advance said conduit after said bending means has been inactivated, a second position-sensing means associated with said conduit support means, and means responsive to said second position-sensing means for inactivating said motor-driven conduit support means and subsequently reactuating said bending means.

17. A conduit bending machine as set forth in claim 15 in which there is provided means responsive to said first-named position-sensing means for inactivating said bending means and said motor-driven conduit support means after the conduit has been bent a predetermined amount.

18. In a conduit bending machine, a frame, a conduit bending means carried on said frame, a conduit support mounted on said frame and movable toward said bending means, a support advancing means, a plurality of adjustable bend point indicators on said frame, means operable to adjust the spacing of said bend point indicators in accordance with a predetermined ratio relative to a given radius of bend, electrical contacts carried by said indicators, an electrical contact member carried by said conduit support for successive engagement with said contacts on said indicators, an electromechanical position-sensing gauge associated with the conduit, and electrical control means including said gauge, said electrical contacts and electrical contact member, for successively actuating said bending means, deactuating said bending means, actuating said conduit support advancing means, deactuating said conduit advancing means and reactuating said conduit bending means.

19. In a conduit-bending machine, a main frame, a bending frame means providing three, triangularly spaced sections, a conduit support at two of said sections, a piston cylinder conduit-bending unit at the third section operable to expand and bend conduit by applying force in a direction midway between the other two sections, and means pivotally mounting said bending frame at one of said two sections on said main frame, and means carried by said main frame beyond said bending frame means for gripping the conduit to be bent.

20. In a conduit-bending machine, frame means providing two spaced areas of support for a conduit, a cylinder unit carried by said frame means at a region intermediate and to one side of said two areas of support, a main piston in said cylinder carrying a conduit-engaging shoe, an auxiliary kick-out piston within said main piston and operable through said shoe, said cylinder and said piston being constructed and arranged to permit of the independent extension of said main and auxiliary pistons.

References Cited in the file of this patent

UNITED STATES PATENTS

| | | |
|---|---|---|
| 2,615,490 | Maicey et al. | Oct. 28, 1952 |
| 2,824,594 | Gray | Feb. 25, 1958 |
| 2,867,261 | Traupmann | Jan. 6, 1959 |